Figure 1:
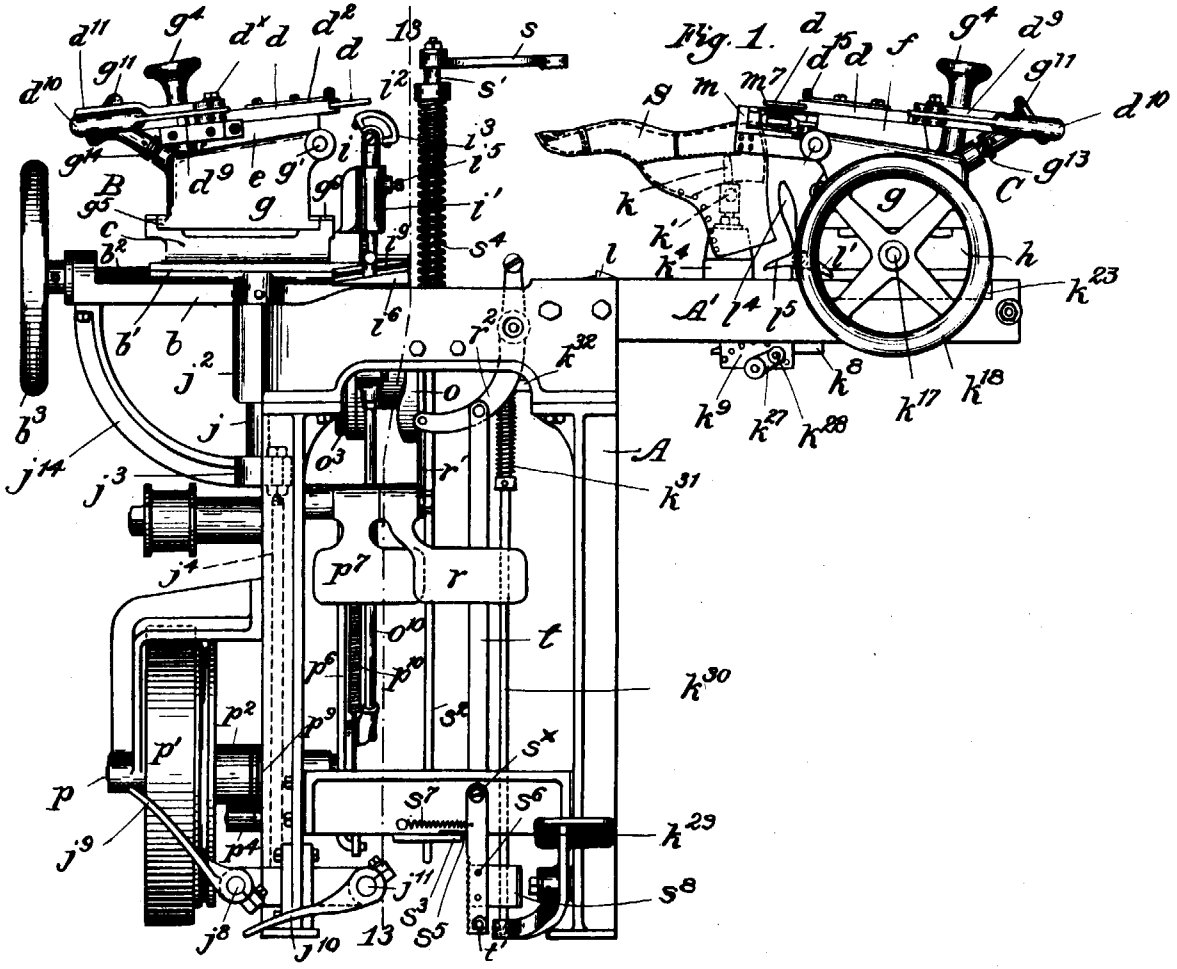

12-12.4 AC 353 EX

FIL 310 OR RE 13,505

P. R. GLASS.

LASTING MACHINE.

APPLICATION FILED MAR. 11, 1912.

Reissued Jan. 7, 1913.

Reissue of 957,949 5/14

13,505.

11 SHEETS—SHEET 1.

WITNESSES

Beatrice J. Smith

Walter W. Henry

INVENTOR

Perley R. Glass, by Robt. P. Harris,

Atty.

B = toe carriage e = upper carriage g = main carriage body c = base of the carriage

COLUMBIA PLANOGRAPH CO., WASHINGTON, D. C.

Fee 376,171 Dec 2 1

Lasting Machines.

P. R. GLASS.

LASTING MACHINE.

APPLICATION FILED MAR. 11, 1912.

Reissued Jan. 7, 1913.

13,505.

11 SHEETS—SHEET 2.

WITNESSES.
Beatrice J. Smith
Hector M. Henry.

INVENTOR.
Perley R. Glass,
by Robt. H. P. Harris,
Atty.

COLUMBIA PLANOGRAPH CO., WASHINGTON, D. C.

P. R. GLASS.

LASTING MACHINE.

APPLICATION FILED MAR. 11, 1912.

Reissued Jan. 7, 1913.

13,505.

11 SHEETS—SHEET 3.

WITNESSES:

Beatrice J. Smith

Hicks W. Henry.

INVENTOR.

Perley R. Glass, by Robt. P. Harris, atty

COLUMBIA PLANOGRAPH CO., WASHINGTON, D. C.

P. R. GLASS.

LASTING MACHINE.

APPLICATION FILED MAR. 11, 1912.

Reissued Jan. 7, 1913.

13,505.

11 SHEETS—SHEET 4.

WITNESSES:

Beatrice F. Smith

Herbert W. Hearty

INVENTOR

Perley R. Glass by Robt. P. Harris, atty.

P. R. GLASS.
LASTING MACHINE.
APPLICATION FILED MAR. 11, 1912.
Reissued Jan. 7, 1913.
13,505.
11 SHEETS—SHEET 5.
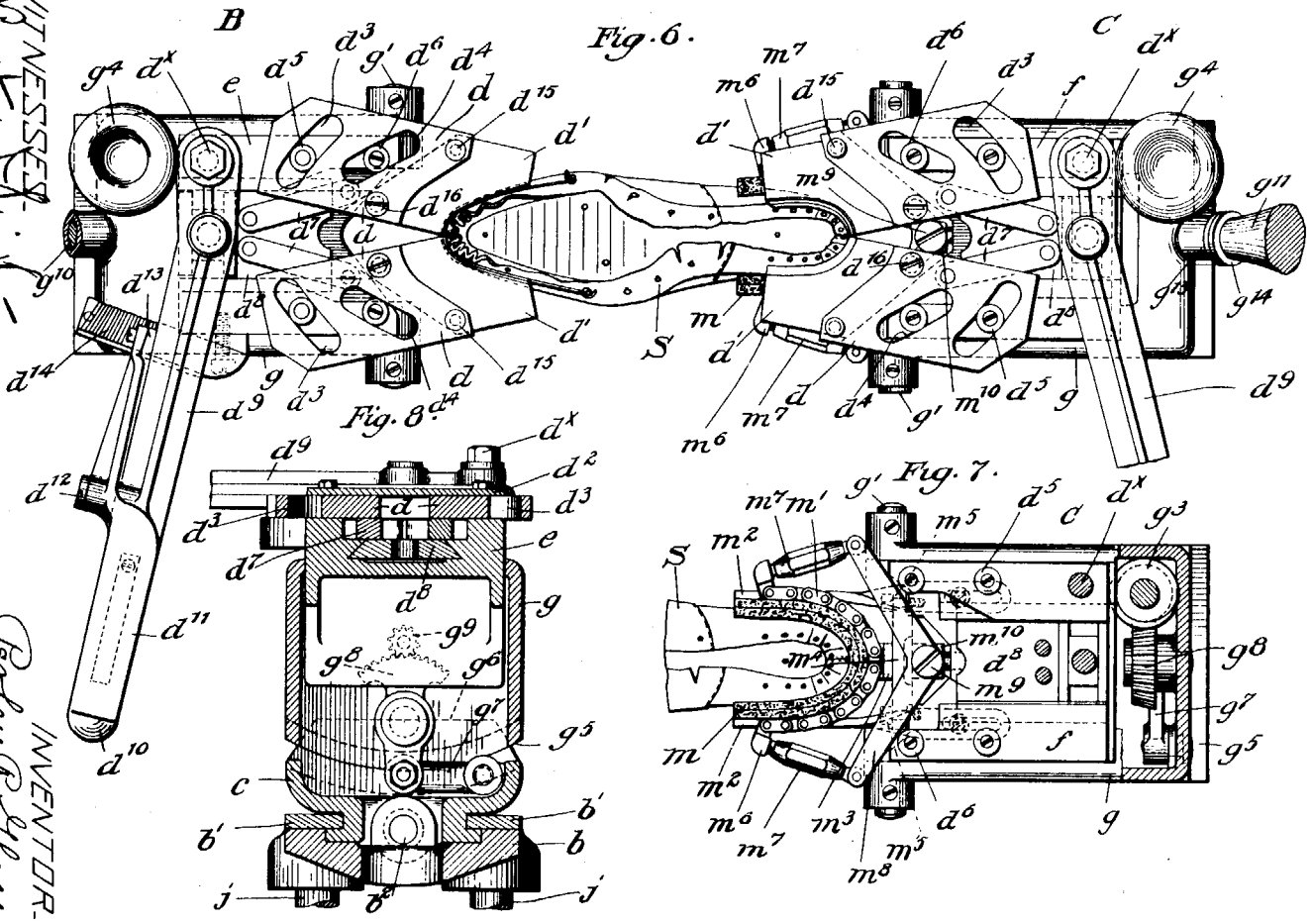
WITNESSES:
Beatrice F. Smith
Herbert W. Henry.
INVENTOR.
Perley R. Glass,
by Robt. P. Harris
atty.
COLUMBIA PLANOGRAPH CO., WASHINGTON, D. C.

Shoe Making
Machines
End Lasting

P. R. GLASS.

LASTING MACHINE.

APPLICATION FILED MAR. 11, 1912.

Reissued Jan. 7, 1913.

13,505.

11 SHEETS—SHEET 6.

WITNESSES.
Beatrice J. Smith
Herbert W. Hertz

INVENTOR.
Perley R. Glass
by Robt. P. Harris.
atty.

COLUMBIA PLANOGRAPH CO., WASHINGTON, D. C.

P. R. GLASS.

LASTING MACHINE.

APPLICATION FILED MAR. 11, 1912.

Reissued Jan. 7, 1913.

13,505.

11 SHEETS—SHEET 7.

WITNESSES:
Beatrice J. Smith
Herbert H. Henry.

INVENTOR
Perley R. Glass
by Robt. P. Harris,
atty.

COLUMBIA PLANOGRAPH CO., WASHINGTON, D. C.

Lasting Machines
End Lasting.

P. R. GLASS.
LASTING MACHINE.
APPLICATION FILED MAR. 11, 1912.

Reissued Jan. 7, 1913.

13,505.

11 SHEETS—SHEET 8.

WITNESSES.
Beatrice J. Smith
Arthur W. Strantz.

INVENTOR.
Perley R. Glass
by Robt. P. Hanes,
atty.

COLUMBIA PLANOGRAPH CO., WASHINGTON, D. C.

P. R. GLASS.

LASTING MACHINE.

APPLICATION FILED MAR. 11, 1912.

Reissued Jan. 7, 1913.

13,505.

11 SHEETS—SHEET 9.

WITNESSES:
Beatrice J. Smith
Herbert W. Henry

INVENTOR
Perley R. Glass
by Robt. G. Harris,
atty.

COLUMBIA PLANOGRAPH CO., WASHINGTON, D. C.

P. R. GLASS.

LASTING MACHINE.

APPLICATION FILED MAR. 11, 1912.

Reissued Jan. 7, 1913. 13,505.

11 SHEETS—SHEET 10.

WITNESSES.
Francis J. Quirk
Herbert H. Henry

INVENTOR.
Perley R. Glass
by Robt. P. Hawes,
Atty.

COLUMBIA PLANOGRAPH CO., WASHINGTON, D. C.

12. BOO
Lasting Machines
Spd Lasting

P. R. GLASS.

LASTING MACHINE.

APPLICATION FILED MAR. 11, 1912.

Reissued Jan. 7, 1913.

13,505.

11 SHEETS—SHEET 11.

WITNESSES
Beatrice J. Smith
Stefan W. Stentz.

INVENTOR.
Perley R. Glass
by Robt. P. Harris.
Atty.

COLUMBIA PLANOGRAPH CO., WASHINGTON, D. C.

UNITED STATES PATENT OFFICE.

PERLEY R. GLASS, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

LASTING-MACHINE.

13,505. Specification of Reissued Letters Patent. Reissued Jan. 7, 1913.

Original application filed December 30, 1905, Serial No. 293,947. Renewed February 24, 1910, Serial No. 545,713. Original No. 957,949, dated May 17, 1910. Application for reissue filed March 11, 1912. Serial No. 683,093.

*To all whom it may concern:*

Be it known that I, PERLEY R. GLASS, a citizen of the United States, residing at Boston, in the county of Suffolk and State of Massachusetts, have invented an Improvement in Lasting-Machines, of which the following description, in connection with the accompanying drawings, is a specification, like letters on the drawings representing like parts.

My invention relates to lasting machines and will be best understood by reference to the following description when taken in connection with the accompanying illustration showing one specific embodiment thereof, while its scope will be more particularly pointed out in the appended claims.

Figure 2:
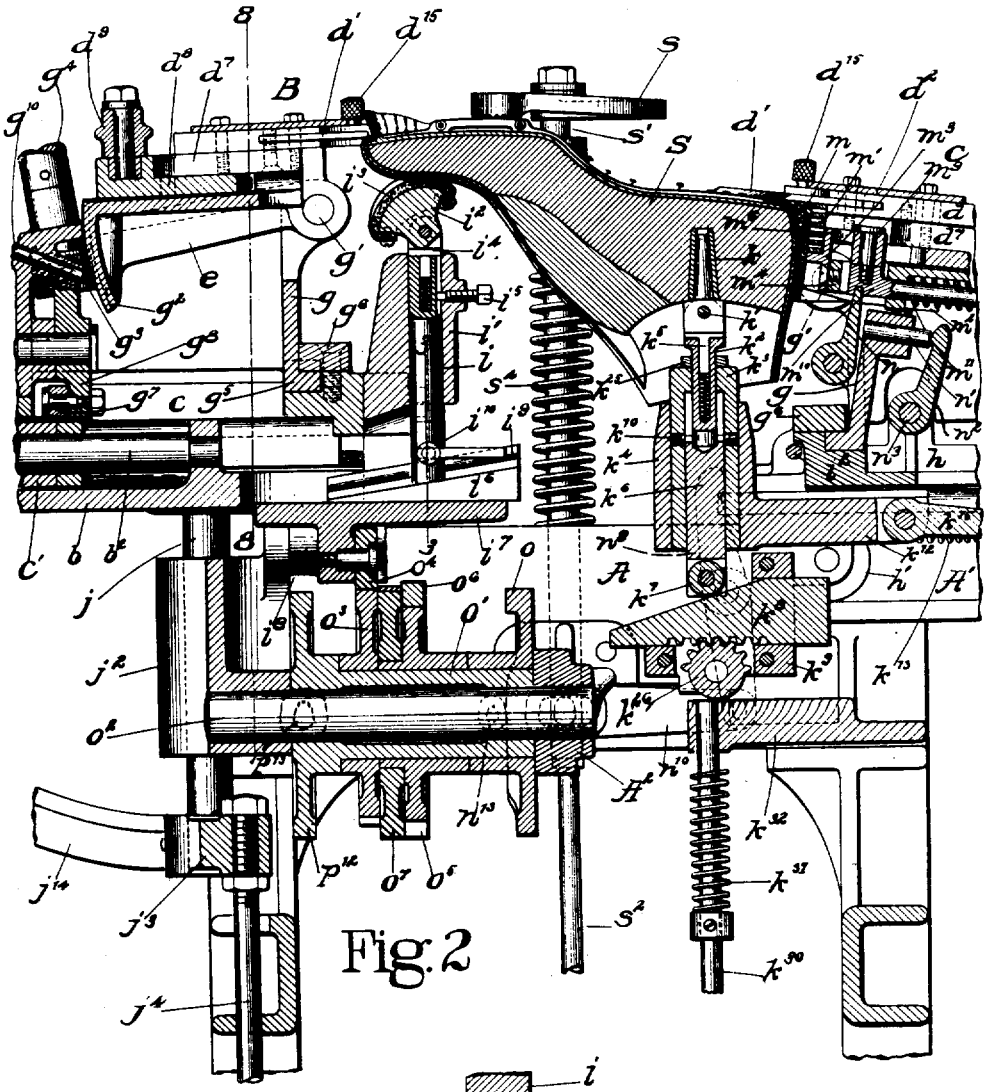
Figure 3:
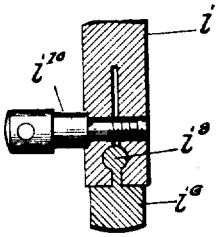
Figure 4:
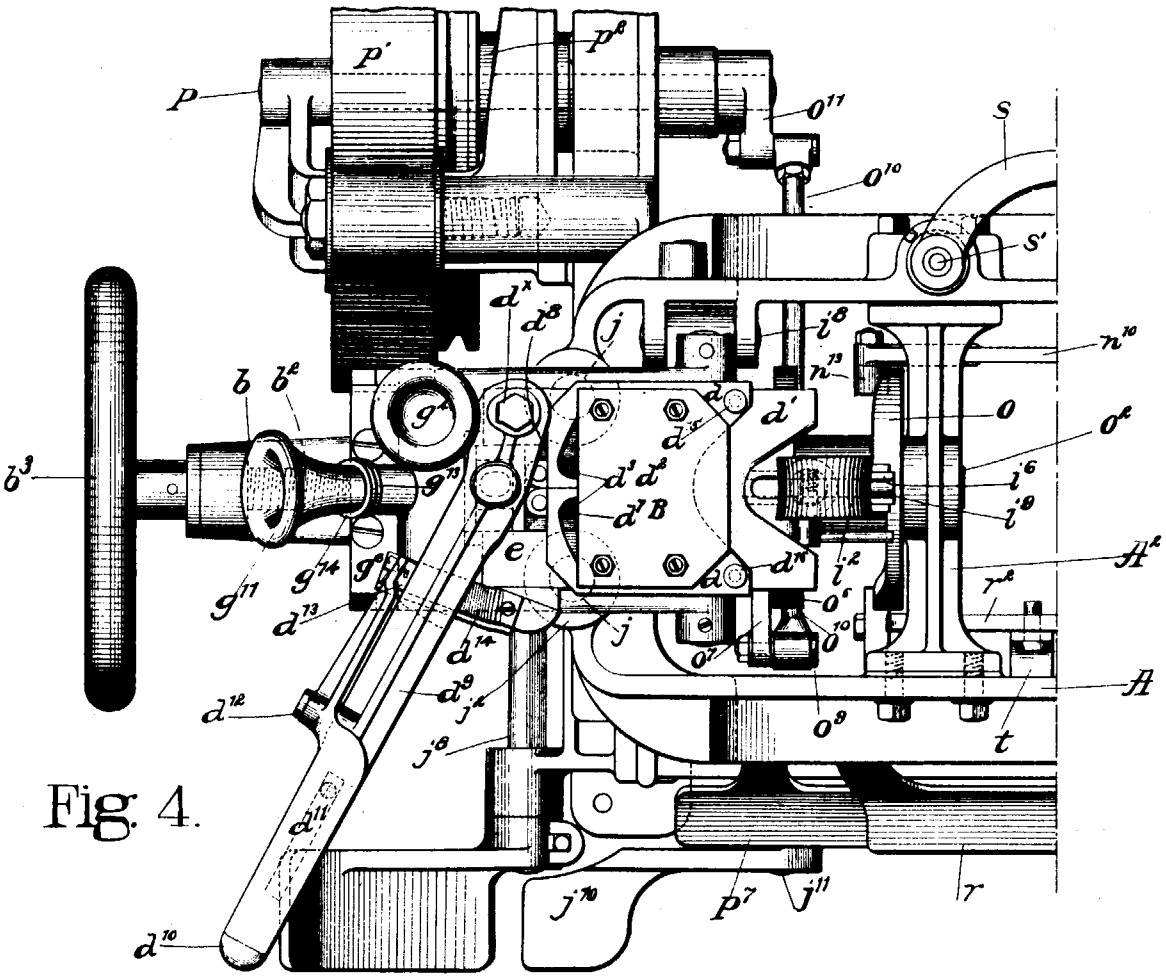
Figure 5:
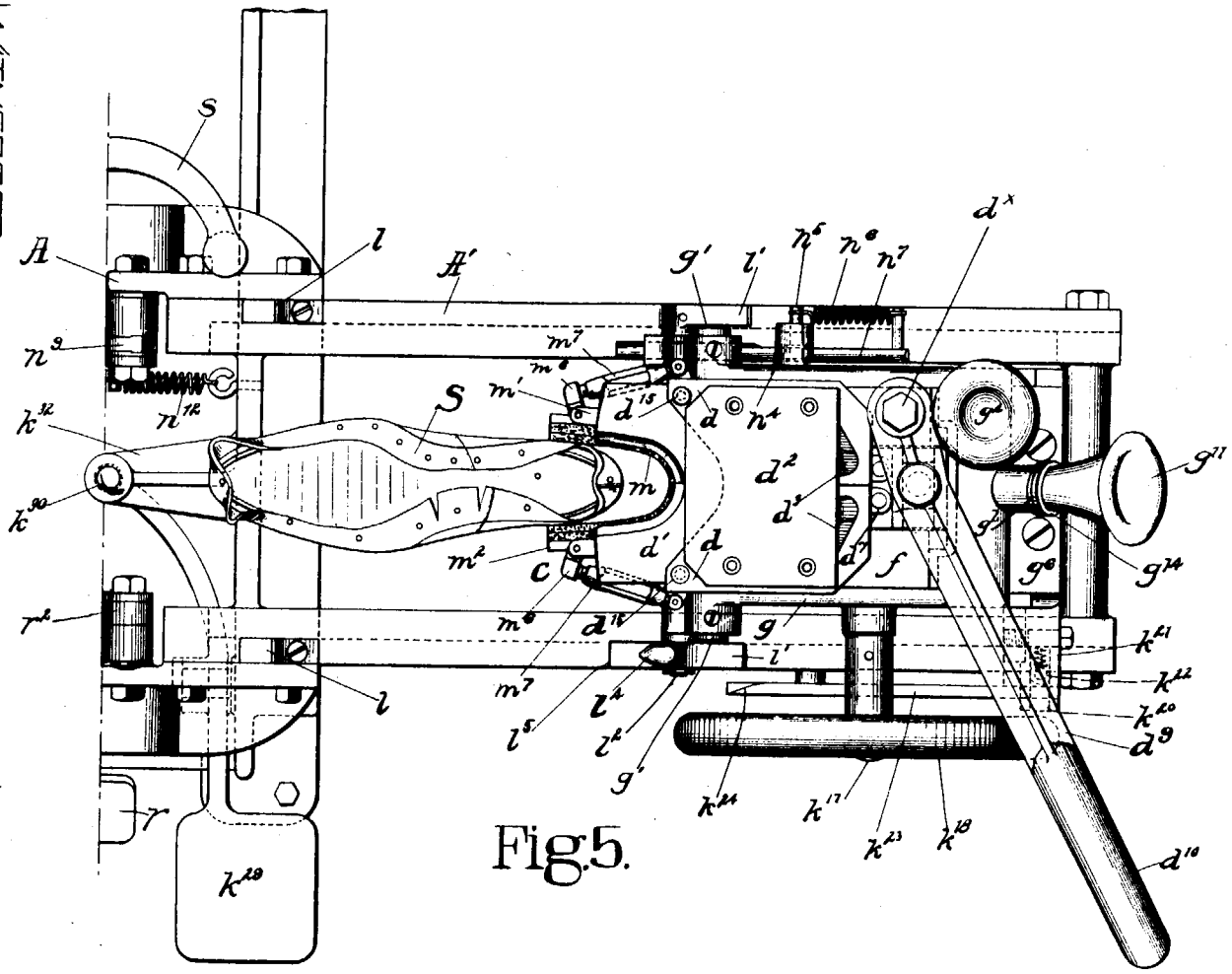
Figure 9:
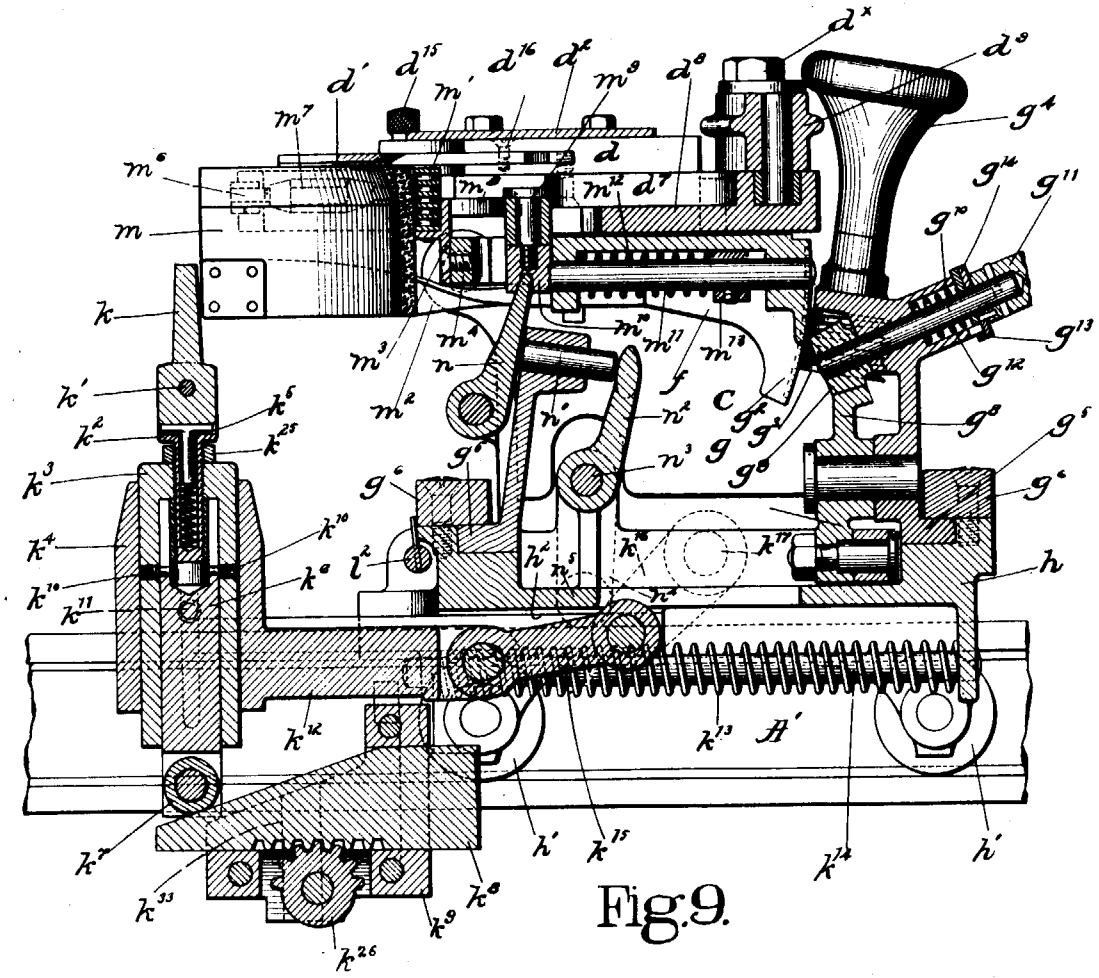
Figure 10:
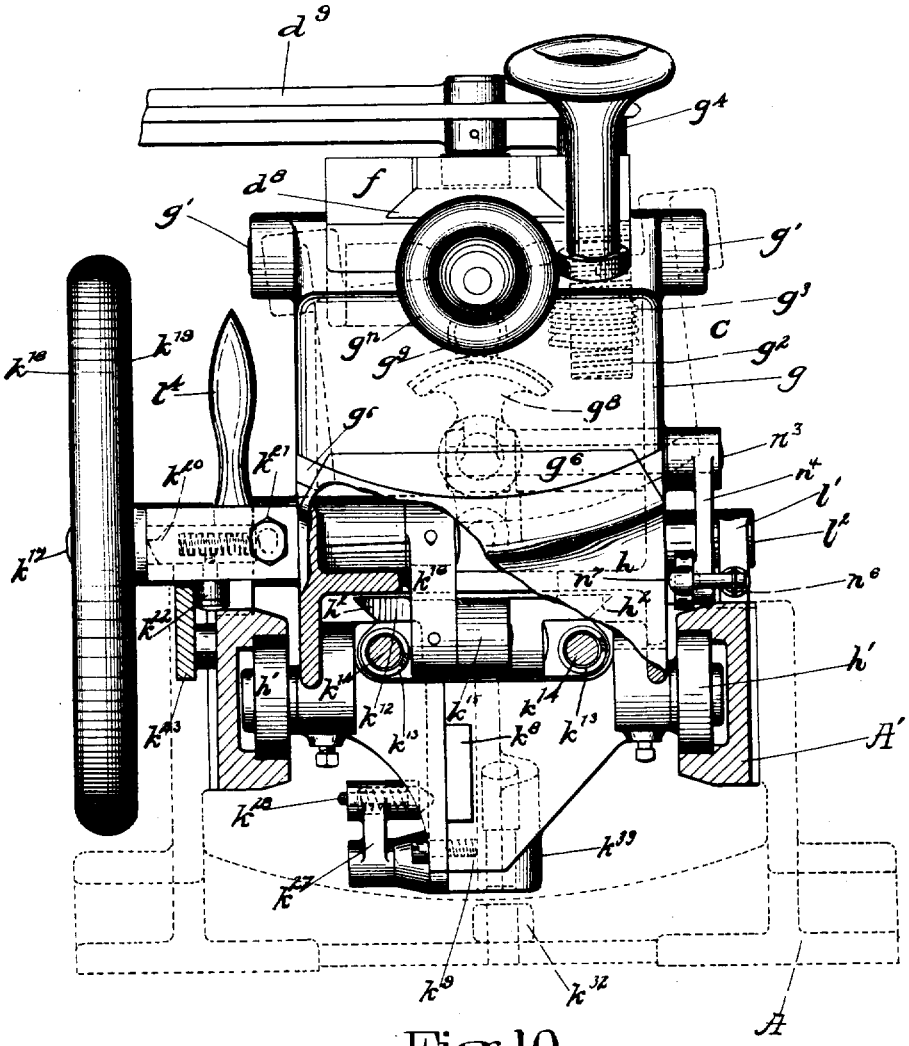
Figure 11:
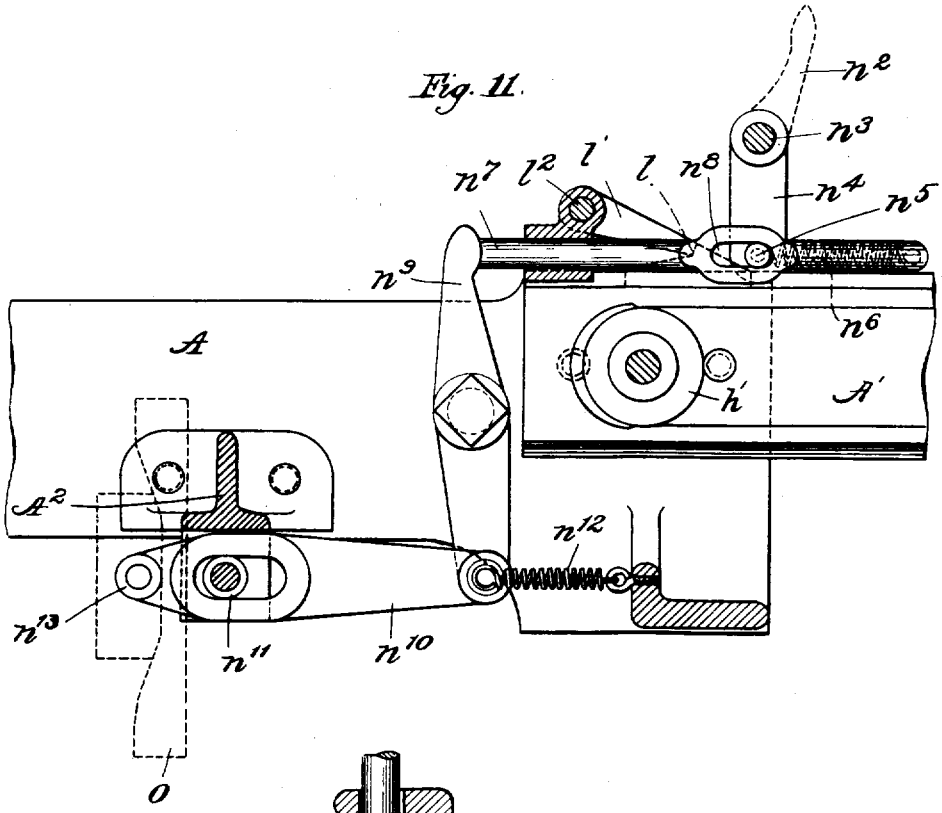
Figure 12:
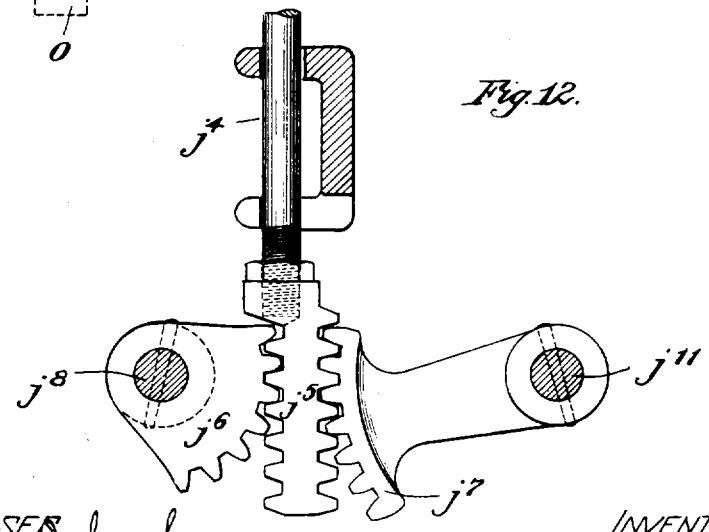
Figure 13:
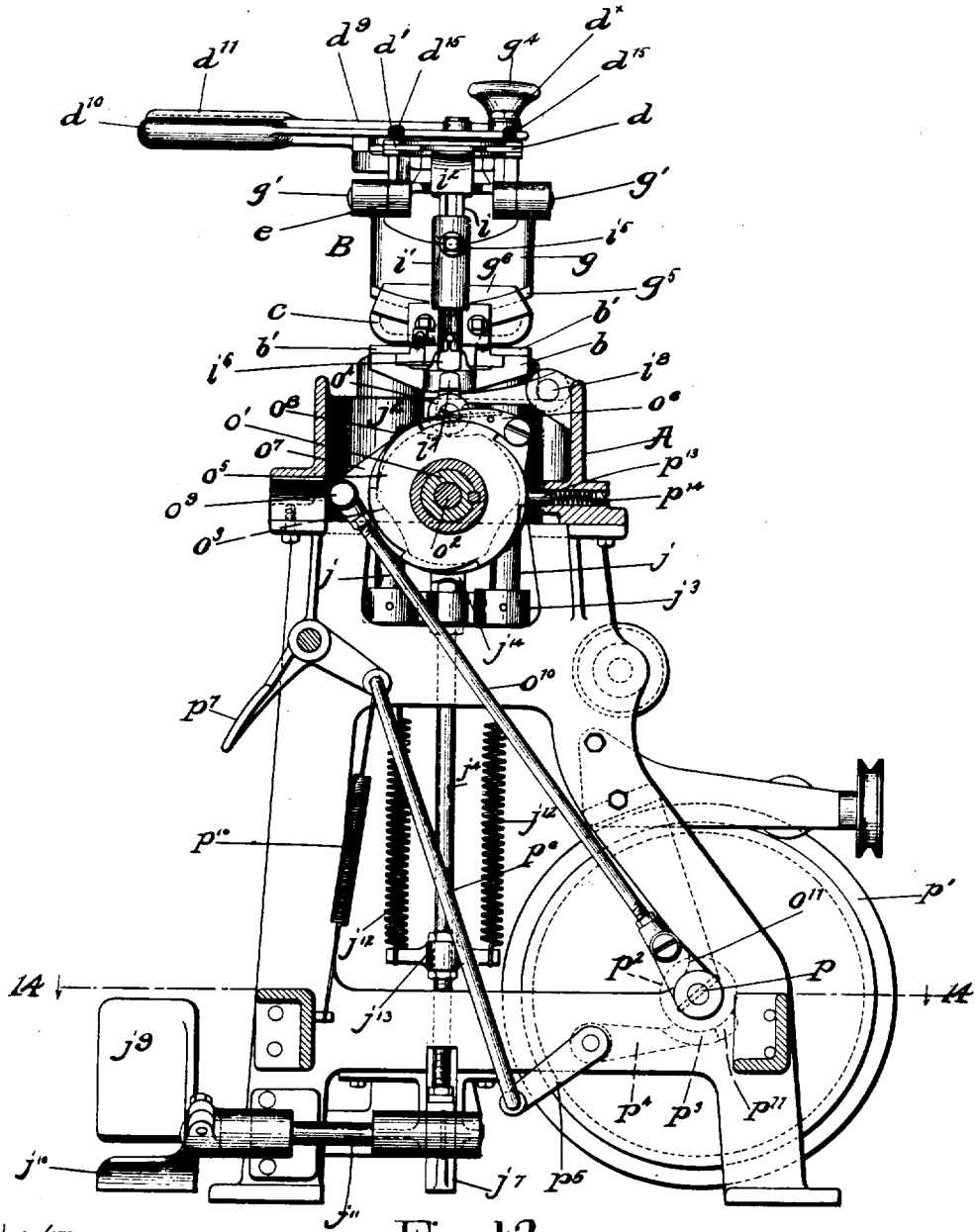
Figure 14:
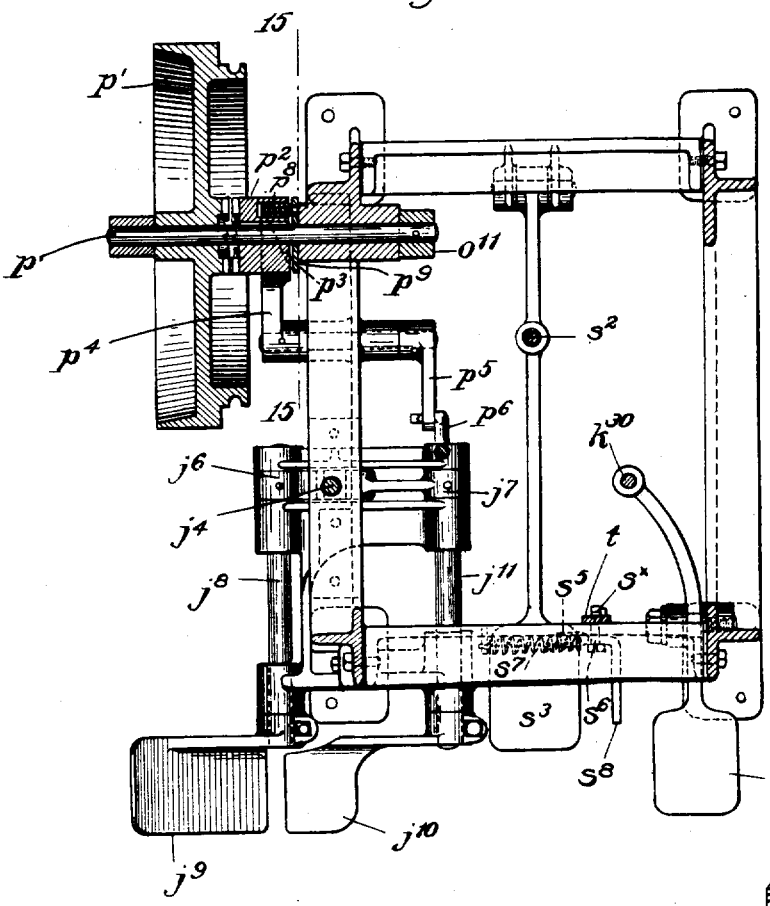
Figure 15:
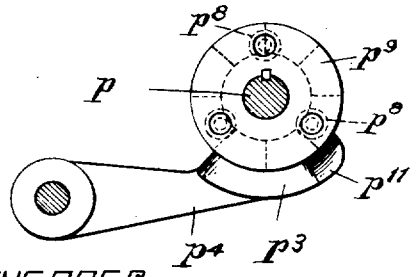
Figure 16:
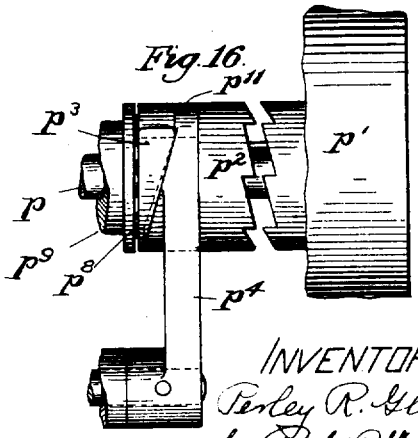
Figure 17:
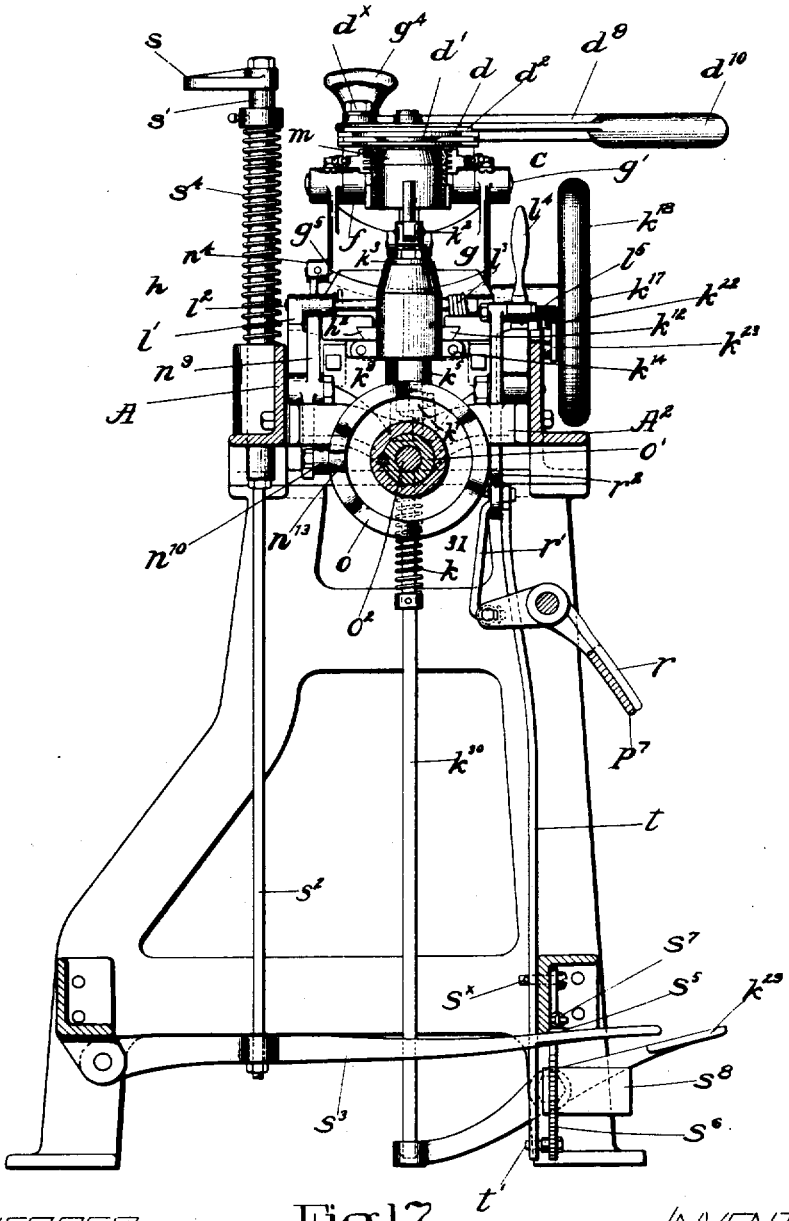

In the drawings,—Figure 1 shows in front elevation a lasting machine embodying one form of my invention; Fig. 2 is a vertical central sectional view partially broken away, and on an enlarged scale, showing the principal working parts in the heel and toe heads; Fig. 3 is a section on the line 3—3 in Fig. 2 showing the toe post clamp; Fig. 4 is a plan view on the same enlarged scale showing that end of the machine which carries the toe head; Fig. 5 is a plan of the remainder of the machine including the part carrying the heel head; Fig. 6 is a plan showing the two heads, positioned with reference to a jacked shoe, and with certain parts removed to show the details of the wipers; Fig. 7 shows, in plan, the heel carriage with parts removed to illustrate the details of the heel band; Fig. 8 is a section, in elevation, of the toe head taken on the line 8—8 in Fig. 2 and looking toward the end of the machine; Fig. 9 is a section in elevation and on a still further enlarged scale taken centrally and longitudinally through the heel head and showing the principal working parts thereof; Fig. 10 is a rear end view of the heel head on the same scale as Fig. 9; Fig. 11 is a detail partially in section showing on an enlarged scale certain of the heel-band-clamping levers; Fig. 12 is an enlarged detail showing the toothed sectors for moving the toe head; Fig. 13 is a transverse section on the line 13—13 in Fig. 1 looking toward the toe head, showing the machine on a somewhat larger scale; Fig. 14 is a plan view in partial section, taken on the line 14—14, in Fig. 13; Fig. 15 is a section on the line 15—15, in Fig. 14, looking toward the sliding clutch member; Fig. 16 is a view of the sliding clutch member and the swinging actuator looking up from beneath the same, and Fig. 17 is a transverse section in elevation, similar to that of Fig. 13, but looking in the opposite direction toward the heel head.

Referring to the drawings and to the embodiment of my invention there illustrated, the main frame A (Fig. 1) of the machine is suitably supported and formed to provide a bed for the oppositely disposed toe and heel carriages B and C, respectively, which latter are provided with suitable lasting devices for operating upon the shoe to be lasted, the heel carriage C carrying also suitable means for presenting the shoe to the lasting devices and for releasing the same after lasting, as will be fully described.

Referring, first, more particularly to the toe head, the same comprises (Figs. 1, 2 and 8) a rest $b$ horizontally fixed, but, as hereafter described, vertically movable, the said rest having formed thereon suitable guide-ways lengthwise the machine, along which is slidably mounted the appropriately formed base $c$ of the toe carriage, the same being retained in its guideways by overlying gibs $b'$ (Fig. 8). Journaled in the rest and held against longitudinal movement is the adjusting screw $b^2$ having threaded engagement with the nut $c'$ (Fig. 2) upon the carriage base and provided outside of and beyond the extended end of the rest with a hand wheel $b^3$. By means of the hand wheel the operator can adjustably advance the carriage lengthwise the machine to or from the work.

Both the heel and toe carriages are provided (Figs. 4, 5 and 6) with similarly constructed and arranged pairs of wiper plates $d$, to which are removably secured appropriately shaped wiper jaws $d'$, the wiper plates being covered by the protecting plate $d^2$ in Figs. 4 and 5 which latter is removed in Fig. 6 for sake of clearness. Each plate is provided with the pair of guiding slots $d^3$ and $d^4$, respectively, the walls of which engage with longitudinally alined upright guiding rolls $d^5$ and $d^6$, journaled in the wiper carrier, which latter in the toe carriage is designated by $e$ and in the heel carriage by $f$.

The slots are so shaped and positioned with reference to the rolls that the wipers are caused to undergo a combined swinging and sliding movement. This is such that the forward movement of the plates causes the jaws to move bodily forward and at the same time to swing in and close about their inner adjacent median edges, which latter are maintained continually in contact to effect the usual wiping of the leather upon the shoe S undergoing lasting, without causing wrinkling or marring of the leather between the wiping plates.

Each wiper is connected for forward movement about the guiding rolls by an underlying link $d^7$, attached to the sliding guide block $d^8$ (Figs. 2, 6 and 8) slidably mounted in overlying beveled guideways (Fig. 8) for longitudinal movement in the wiper carrier $e$ beneath the wiper plates. This connection of the plates to the sliding actuator or guide block provides a very compact construction requiring but small space, so that, when retracted, the plates (Fig. 4) which are of a general rectangular formation, conform to the general outline of the carriage top. The block $d^8$ has jointed thereto the lever $d^9$, one end of which has a relatively fixed fulcrum upon the wiper carrier at $d^x$, the opposite end having the handle grip $d^{10}$. By means of this handle the operator at will can move the guide block lengthwise the carrier, causing the wiper jaws to close in toward or open and release the jacked shoe, as will be clear from Fig. 6.

The handle grip upon the lever attached to the toe carriage has the overlying thumb piece $d^{11}$ forming part of a lever, which latter is fulcrumed at $d^{12}$ and carries at its opposite end a pawl or catch $d^{13}$ spring-pressed to engage with the teeth of the underlying stationary rack $d^{14}$ secured to the side of the wiper carrier, the teeth of the said rack being inclined to permit the toe wiper plates to be temporarily held in any position to which they may be inwardly moved. Similar means for holding the heel wipers in position may be employed but not being ordinarily required such means are not here shown.

In order that the wiper jaws may be quickly removed or replaced by others of different pattern each one is held in a split or recess in the edge (Fig. 2) of the plate $d$ and near the outer edge of the jaw by a removable upwardly projecting pin $d^{15}$ and near its inner edge by a screw $d^{16}$ sunk into the wiper plate above. The screw, however, engages an inclined open-ended slot in the underlying wiper jaw, so that while firmly held against displacement during use, each jaw can be readily withdrawn laterally and forwardly by merely removing the single retaining pin $d^{15}$.

Both the heel wipers and the toe wipers are mounted to permit their adaptation to different pitches or inclinations of the last lengthwise the machine, the adjusting means being substantially the same for both carriages. For this purpose the toe wiper carrier $e$ and the heel wiper carrier $f$ are each adjustably mounted upon the respective main carriage bodies $g$ by means of transversely disposed trunnions $g'$ (Figs. 2, 6 and 13) fixedly held near the forward end of the carriage body and journaled in lugs upon the wiper carrier, whereby the latter is pivotally mounted for adjustment about a transverse axis. Each wiper carrier (Figs. 2, 9 and 10) has depending at its rear a toothed segmental portion $g^2$ which meshes with a worm $g^3$, the latter connected to a small upright hand wheel $g^4$, journaled in the carriage body $g$ and projecting up and through the rear of the carriage so as to be conveniently accessible to the operator for quickly adjusting the inclination of the wipers. By the use of the worm and the worm gear segment, there is provided means, not only for a delicate adjustment, but for an effectual locking of the parts when the hand wheel is released. The carriage in each case forms a box or shell-like compartment for the interior working parts, closed at the sides and rear and having its top partially formed by the wiper carrier, which may be adjustably inclined as described.

In addition to the adjustment of the wipers to different inclinations lengthwise the last, they may also be rocked or adjusted laterally to different inclinations transversely of the last. For this purpose the lower front and rear walls of the main carriage body (Figs. 7, 9 and 10) are provided with flanged and transverse curved segmental bearing portions $g^5$, which are slidably mounted in correspondingly curved guideways formed in the carriage base, the toe carriage base being designated by $c$ and the heel carriage base by $h$. The stationary segmental gibs $g^6$ overlie the flanged bearing portions and prevent all movement of the carriage body upon the base except a sliding, rocking movement, which, owing to the curvature of the bearing portions and the guideways, takes place about an axis passing through the line of action of the wiper jaws when the latter are in a mean or horizontal plane, a displaced position of the carriage, for example, being shown in dotted lines in Fig. 10.

To permit the described adjustment, each carriage base (Figs. 7, 8 and 9) at its rear has fulcrumed to it the link $g^7$, which latter is connected to the depending end of a segmental beveled gear $g^8$, pivoted or journaled upon the carriage body and meshing with the beveled pinion $g^9$, which is secured to one end of the upwardly and rearwardly inclined shaft $g^{10}$. The latter is pinned or otherwise secured to the rearwardly projecting hand wheel $g^{11}$ (Fig. 1), by which the segmental gear may be turned and the carriage body swung or forced to one side or the other upon the curved guideways about its connection to the link $g^7$ as a fulcrum, this operating, as is evident, adjustably to tip or rock the wiper jaws laterally.

Where the shaft $g^{10}$ passes through the walls of the carriage body (Fig. 9) there is provided a cylindrical cup or pocket containing the compression spring $g^{12}$ which presses outwardly against the loose washer $g^{13}$ and causes it frictionally to engage the washer $g^{14}$, fastened to the hand wheel $g^{11}$ to retard the movement of the parts. This acts as a friction device to prevent the accidental displacement of the carriage body from its adjusted position upon the curved guideways. The washers may be of cast iron or any other suitable friction material, such as leather or the like, to increase this retardation.

The adjustment of the wiper plates described is substantially the same for both the heel and the toe carriages, and the wiper plates themselves upon the two carriages, except for the shape of the attached jaws, may be, and herein are, of substantially the same construction.

Referring more particularly to Figs. 2 and 3 and to the toe carriage there shown, the latter is provided at the fore-part thereof (Figs. 1, 2, 4 and 13) with a vertically slidable toe post $i$, mounted in the upright post support $i'$, the latter carried upon a bracket which is clamped to the front face or wall of the carriage base $c$. The upper end of the post is forked to form ears, between which is pivotally mounted the padded toe rest $i^2$, the curved face of which, preferably centered at the pivot, is covered with leather or other suitable cushioning material $i^3$ and adapted to underlie the toe of the jacked shoe, as shown in Fig. 2. The rest is normally moved to an upright position by the upward pressure received from the head of a spring-pressed pin $i^4$ engaging the flattened lower end of the rest between the forked ears. Any tendency to relative movement, however, between the leather of the shoe and the contacting rest, whether due to the stretch of the leather or slight movements of the jacked shoe, permits the rest to be rolled or swung more or less about its pivot from the normal position, to adapt itself to the changed position of the leather without straining or marring the same. The post is prevented from turning by a threaded stud $i^5$ in the post support, which engages with a groove lengthwise the post. After the shoe is jacked, the toe rest is raised in its support and pressed against the underlying leather of the toe. For this purpose, the post at its bottom is secured to a sliding rest $i^6$, which latter is supported loosely upon the flat top of a swinging shelf $i^7$, which, Fig. 4, is pivoted at $i^8$ to the frame of the machine, but which by mechanism to be described can be swung up and down at appropriate times to raise and lower the shoe and its attached toe rest. To adjustably vary the limits of vertical movement of the toe post, the lower end thereof is split (Figs. 2 and 3), being suitably formed to embrace a tongue $i^9$ which is formed upon the upper side of the sliding rest $i^6$. The tongue and the upper face of the rest against which the lower edges of the toe post abut, are inclined to form a wedge-shaped cam. The toe post is provided with a clamping screw $i^{10}$ to clamp the split lower end securely to the tongue $i^9$. When adjustment of the toe post is desired, it is unclamped and after the slide is moved forward or backward sufficiently to give the desired adjustment to the post, the latter is again clamped in position.

Referring again to the toe carriage (Figs. 1 and 2), the rest $b$, which supports the carriage base and the wiper parts, is vertically adjustable to permit relative vertical movement between the wiper jaws and the jacked shoe. For this purpose the rest is carried upon upright rods $j$ (Figs. 1, 2 and 8) which are guided for vertical sliding movement in a part $j^2$ of the frame, the lower ends of the rods being connected to the cross-head $j^3$, to which is secured the vertical and appropriately guided actuating rod $j^4$. The latter (Figs. 12, 13 and 14) carries at its lower end the double faced rack $j^5$, the opposite faces of which mesh respectively with the toothed segments $j^6$ and $j^7$. The segment $j^6$ (Fig. 14) is fast to the horizontal shaft $j^8$, which carries at its outer end, conveniently located with reference to the position of the operator, the foot treadle $j^9$, downward pressure upon which acts to move the segment and raise the rack, actuating rod and toe carriage. This movement is performed at the beginning of the toe lasting, the wipers at the same time being moved inwardly by the hand lever $d^9$ to engage the leather at the sides of the toe and wipe it up and over the sides of the toe. The wipers are then moved inwardly over the insole to wipe the leather in and down over the same. During the latter operation the weight of the toe head alone may be relied upon to press the wipers down and against the leather overlying the insole, but I have also here provided a second and separate foot lever $j^{10}$, connected to a shaft $j^{11}$ which is secured to the segment $j^7$, before referred to, whereby pressure upon the said foot lever $j^{10}$ may act in addition to the weight of the toe to force the wipers down.

Vertical tension springs $j^{12}$ (Fig. 13) are secured at their upper ends to the framework and at their lower ends to the cross-piece $j^{13}$, fast upon the plunger-rod $j^4$, the said springs thereby acting to counterbalance a portion of the weight of the toe head, whereby the effort required to raise the same is reduced. A brace $j^{14}$ connected to the cross-head $j^3$ assists in supporting the outer end of the rest $b$.

Referring more particularly to the heel carriage, the base $h$ thereof is provided with pairs of rollers $h'$ (Figs. 9 and 10), which engage with suitably formed horizontal guide-ways formed on the inside of the horizontal frame extension A′ and upon which the heel carriage with its attached jack post may be freely moved lengthwise the bed of the machine and toward or away from the toe carriage.

The jack post (Figs. 2, 9 and 17) has a pin $k$ pivoted at $k'$ between the forked ears of a threaded stud $k^2$, the latter being adjustably threaded into and through the upper end of the vertically slidable sleeve $k^3$, which sleeve is carried for sliding movement in the post support $k^4$. The spring-pressed pin $k^5$ having a flat head bearing against the lower edge of the pivoted pin $k$ is provided in the threaded stud to normally maintain the pin in an upright position, while permitting the same to yield slightly from that position. The sleeve $k^3$ is horizontally rigid, that is, non-swinging, and the post therefore having no rocking movement, except as permitted by the pin, is adapted to give the shoe firm support. Within the sleeve $k^3$ and protruding from the lower open end of the latter, is the interior heel post rod $k^6$, the lower protruding end of which is cut away at one side to carry the revoluble guide roller $k^7$, which latter is adapted to contact with the inclined face of the wedge or cam-shaped guide shoe $k^8$, the said cam-shaped guide shoe being mounted for adjustable movement lengthwise the bed of the machine in the bracket $k^9$, clamped or otherwise secured to the carriage base $h$ for movement therewith. The heel post rod $k^6$ is prevented from turning within the sleeve by means of threaded pins $k^{10}$ engaging grooves lengthwise the rod, and the sleeve $k^3$ is similarly prevented from turning within the post support by the pin $k^{11}$, shown in dotted lines Fig. 9.

The post is freely slidable in a vertical direction under the control of the cam-shaped guide shoe alone, no other supporting medium being here employed, and, since the cam affords an unyielding support for the sleeve $k^3$ and the sleeve an unyielding support for the shoe to be lasted, the latter is held in its lasting position without danger of slippage.

A last having been placed upon the heel pin $k$, the post is then caused to move upward and backward to seat the counter of the shoe firmly into the heel band. For this purpose the post support $k^4$ is attached to a slide $k^{12}$, which is slidable lengthwise the heel carriage base (Fig. 10) in grooved ways $h^2$. Compression springs $k^{13}$ (Fig. 9) encircling parallel longitudinal rods $k^{14}$, the latter passing through the slide, normally tend to force the slide and its post forward and away from the heel band. The slide, however, may be retracted against the compression of these springs by means of the link $k^{15}$, jointed at its rear end to the vertically swinging lever $k^{16}$ (Fig. 10), the latter secured to the transverse carriage shaft $k^{17}$, journaled in the carriage base. To the outer end of the shaft is fastened a large hand wheel $k^{18}$, by turning which the operator can retract the slide through the connections described.

The inner face of the hand wheel is provided (Figs. 5 and 10) with a series of ratchet teeth $k^{19}$ which are adapted to engage with a transversely sliding pawl $k^{20}$, the latter being slidably mounted in a bracket $k^{21}$, fixed to the side of the carriage base. The pawl carries a depending pin working in a slot in the bracket and provided with a roller $k^{22}$, the latter adapted to contact with the inner face of a longitudinal cam guide $k^{23}$ and retract the pawl when the heel carriage is moved to its outer position, such for example, as is shown in Figs. 1 to 5, thereby leaving the springs $k^{13}$ free to return the heel or jack post slide forward when the hand wheel is released.

When the shoe is jacked, the operator gives the hand wheel a partial turn in a left-hand direction, this serving to raise and retract the post and seat the counter of the shoe in the heel band. With the same movement of the hand the carriage is pulled forward on its rollers toward the toe carriage and into some such position as is shown in Fig. 2. In passing to this position the pawl roll $k^{22}$ passes off the rounded front edge $k^{24}$ of the cam plate, permitting the pawl to engage the ratchet teeth on the hand wheel and hold the latter in the position to which the operator has turned it, thereby effectually locking the shoe in its jacked and retracted position. On the subsequent reverse movement of the carriage, after the shoe has been lasted, as will be described, the hand wheel and jack post slide are automatically released by the engagement of the pawl roll with the curved front edge of the cam plate, which causes withdrawal of the pawl from the ratchet teeth of the wheel. The heel or jack post slide is therefore automatically unlocked by the carriage movement and without the need of additional controlling levers to require the special attention of the operator.

The retraction of the post support causes (Fig. 9) the post roller $k^7$ to ride up the inclined face of the cam shoe $k^8$ from the position shown in Fig. 9 approximately to the position shown in Fig. 2, the jacked shoe being thereby elevated during its retraction to bring the heel not only into the heel band but up against the slightly overlying under edges of the wiper jaws.

The jack pin $k$ is vertically adjustable within suitable limits by the threaded engagement of the stud $k^2$ in the sleeve $k^3$, a lock nut $k^{25}$ being employed to lock the pin in its adjusted position. The height to which the jack post is elevated may be varied by adjusting the inclined face of the cam shoe lengthwise the carriage. To effect this, the lower edge of the cam shoe is toothed and meshes with a segmental gear $k^{26}$, journaled in the bracket $k^9$ and having secured thereto, but outside of the bracket, (Figs. 1 and 10), the short lever arm $k^{27}$, by which the gear may be turned and the shoe adjusted to different positions, its position being fixed by the engagement of a spring-pressed pin $k^{28}$ carried thereby with a series of depressions formed in the outer face of the bracket.

The heel carriage is positioned and locked in its forward or advanced position by the catches $l$ (Figs. 1 and 5) secured at appropriate positions on either side of the frame bed and adapted to engage each with a swinging latch $l'$, which latches are secured to opposite ends of a transverse shaft $l^2$ journaled in the forward part of the carriage base, the said latches being normally thrown down to engage each its respective catch by the tension spring (Fig. 17) $l^3$, encircling the said shaft. The latch $l'$ nearest the operator is provided with the handle $l^4$, by means of which manual release of the carriage may be effected at any desired time, and said latch has also the forwardly projecting ear $l^5$ through which the carriage is automatically released, as will hereafter be described.

During lasting it is desirable to exert additional pressure to press the last up and against the wipers and particularly during manipulation of the heel wipers. To permit this there is provided (Figs. 14 and 17) a foot treadle $k^{29}$, fulcrumed to the frame, and adapted to elevate the lifting rod $k^{30}$, which latter is normally depressed by the spring $k^{31}$. The upper end of the rod is guided (Fig. 2) in a bracket $k^{32}$ arranged transverse the frame so as to permit the rod (Figs. 9, 10 and 17) when elevated to pass through a vertically drilled lug $k^{33}$ in the bracket $k^9$ and at the side of the cam-shaped guide shoe $k^8$. When the shoe is jacked and elevated against the heel band and the carriage forwardly positioned, the lower end of the post rod $k^6$, which overhangs the side of the cam shoe is brought into approximate alinement with the lifting rod $k^{30}$ so that elevation of the latter forces the shoe up and against the wiper jaws with a pressure which may be regulated by the operator's foot pressure on the treadle $k^{29}$.

The heel band (Figs. 7 and 9) has the pad $m$ of leather or other suitable material and of suitable and sufficient depth and length. This pad is secured, as by wiring, stitching or other suitable means, to the relatively narrower strip of flexible sprocket chain $m'$ outside of the same. The pad at its outer end is supported and stiffened by the longitudinal exteriorly fastened rods or strips $m^2$, the rear ends of which are twisted to prevent a flattened face to the under side of the wiper carrier to which they are secured by screws, which pass through slots in the flattened faces, so that the strips permit the pad to move forward or back or to open expansively without offering resistance, while still supporting and preserving the form of the same.

At the rear the pad and sprocket chain are supported by the bracket or block $m^3$, which is clamped to the under side of the sprocket chain. The block is supported by attachment to the cross piece $m^4$, which is mounted for a limited sliding movement lengthwise the machine (Fig. 7) upon the studs $m^5$ screwed into the front end of the wiper carrier.

After the shoe to be treated has been seated in the heel band, the ends of the latter are caused to press inwardly and forwardly firmly against the counter to hold the shoe for action by the wipers. For this purpose the last link at each end of the sprocket chain has pivoted to it the connection $m^6$, which is adjustably secured by the rearwardly and outwardly inclined connecting turn-buckle $m^7$ to an arm of the yoke $m^8$, the latter (Fig. 9) being swiveled at its center upon the stud $m^9$ vertically screwed into the head $m^{10}$ carried at the forward end of the rod $m^{11}$, the latter being slidably mounted in and lengthwise of the wiper-carrying plate.

When the yoke is slid forward, by reason of its connections to the pad it forces the pad ends inwardly and forwardly causing the pad to firmly clamp the counter of the shoe. When the yoke is retracted, the pad is opened for the release of the shoe. The head $m^{10}$ and the yoke carried thereby are normally retracted to open the pad by means of the compression spring $m^{12}$ encircling the rod $m^{11}$ between the front wall of the wiper plate and a collar $m^{13}$, the latter secured to the rod.

When the shoe is jacked and retracted against the heel band, it presses back against the pad and causes the cross-piece $m^4$ to seat against the wiper-carrying plate. In jacking the shoe the operator simultaneously rolls the carriage forward into the lasting position indicated in Fig. 2, where it is locked as described. There is then set in motion power-actuated means which act both to tighten the heel band and raise the toe pad into supporting contact with the toe of the jacked shoe.

For the purpose of tightening the heel band, the under side of the sliding head $m^{10}$ (Fig. 9) is cut or grooved to receive the end of a toothed lever $n$, the latter pivoted upon the carriage base for swinging movement in a central vertical plane. This toothed lever may be forced forward to clamp the band through movement of the sliding pin $n'$, which bears rearwardly against the finger $n^2$ the latter secured to the transverse shaft $n^3$ passing to the outside of the carriage, where it is provided with a rigidly attached depending lever arm $n^4$ (Figs. 9, 10 and 11). The lower end of the lever arm $n^4$ has secured to it and projecting either side thereof (Figs. 5, 10 and 11) the pin $n^5$, the outer end of which is secured to the forward end of the tension spring $n^6$. The rear end of the spring is pinned to the rear end of the sliding rod $n^7$, the latter receiving near its forward end (Fig. 11) sliding bearing support from the heel carriage base, and having also a slot $n^8$, in which works the inner end of the pin $n^5$. It will be evident that the rod $n^7$ when forced backwardly, acting through the tension spring $n^6$, will draw back the lever $n^4$ and cause the closing of the heel band against the shoe counter, continued retracted movement of the rod acting to place the increased tension of the spring upon the clamping of the heel by the band.

To actuate the heel clamping rod $n^7$ at the proper moment and to the proper extent, the forward end of the rod projects in advance of its bearing in the heel carriage and when the latter is moved into the lasting position shown in Fig. 2, the end of the clamping rod is positioned (Fig. 11) in alinement with and closely adjacent to the upper end of the actuating lever $n^9$, which is pivoted upon the frame A and jointed at its lower end to the horizontal sliding actuator $n^{10}$. The latter is slotted to receive a roller guide support $n^{11}$, journaled in a transverse frame piece $A^2$, through which the actuator passes and at its rear end is attached to the spring $n^{12}$, by which it tends constantly to be retracted to withdraw the engaging face of the clamp actuating lever from the clamping rod. The opposite end of the actuator slide, however, carries (Figs. 11 and 17) a cam roll $n^{13}$, which is drawn by the spring $n^{12}$ into contact with the suitably formed face of the rotary side cam $o$. The latter (Figs. 2 and 17) is keyed to the cam sleeve, $o'$, mounted for rotary movement upon the stationary shaft $o^2$, which latter is journaled in bearings formed by the transverse frame member $A^2$ and a second transverse end frame member. The cam $o$ may be of any suitable formation, the one illustrated having three depressions and three elevations, such that when moved one sixth of a revolution with the carriage and the jacked shoe in lasting position, the cam causes the closing of the open heel band and when moved another sixth of a revolution, causes the release of the then clamped shoe.

Movement of the cam sleeve $o'$ not only acts to clamp or close the heel band, but also to lift the toe post, and, to this end, in addition to the heel band clamping cam $o$, there is also secured to the cam sleeve (Figs. 2 and 13) a lifting cam $o^3$, with the suitably formed periphery of which is engaged the cam roll $o^4$, the latter journaled upon a depending lug upon the swinging shelf $i^7$ beneath the toe post. The periphery of the lifting cam (Fig. 13) also has three depressions and three elevations and the cam is so positioned with reference to the clamping cam $o$ that at the same time with movement of the latter to clamp or unclamp the shoe counter, the former raises or lowers respectively the swinging shelf and the toe post and toe rest carried thereby.

To effect power-driven movement of the cam sleeve, the latter has keyed thereto (Figs. 2 and 13) the toothed ratchet wheel $o^5$, the outer edge of which is provided with suitable teeth, herein six in number, to correspond to the elevations and depressions of the respective cams and adapted to be engaged (Fig. 13) by the pawl $o^6$ pivoted upon an overhanging pawl support carried by the pawl disk $o^7$, the latter being loosely mounted for free movement upon the hub of the ratchet wheel, and the said pawl being spring-pressed by the spring $o^8$ into engagement with the teeth of the ratchet.

The pawl disk has a radial lug $o^9$, to which is jointed the pawl actuating rod $o^{10}$ extending downwardly and rearwardly for connection to the short crank $o^{11}$ by which it is operatively connected (Fig. 14) to the counter-shaft $p$, the latter being journaled in bearings formed in the frame at the lower back portion thereof.

The outer end of the counter-shaft $p$ has loosely mounted thereon a pulley $p'$, which may be driven by a suitably connected belt or any other source of power, and there are provided suitable clutching devices whereby the driving movement may be communicated at suitable intervals to the counter-shaft and thence through the pawl-actuating rod to the ratchet and pawl mechanism of the cam sleeve, causing the ratchet member and cam sleeve to be moved through a distance corresponding to one of the ratchet teeth for each revolution of the counter-shaft. For this purpose the inner hub of the driving pulley $p'$ is toothed and coöperates with a correspondingly toothed face upon the sliding clutch member $p^2$, the latter being keyed to the counter-shaft. The clutch member (Figs. 14–16) is normally withdrawn from engagement with the teeth of the pulley by the abutment of the radial lug $p^3$, having an inclined cam face, against a corresponding face upon the end of the swinging clutch retracting lever $p^4$ mounted for swinging movement in and out of the path of the radial lug. The retracting lever is secured to a short shaft, the opposite end of which (Figs. 13 and 14) has the crank lever $p^5$ connected to the upwardly and forwardly inclined actuating rod $p^6$, jointed to one arm of the knee lever $p^7$ (Figs. 1 and 13), the latter pivoted at the front of the machine and suitably formed and positioned to be readily moved by the pressure of the operator's knee.

When the knee lever is pressed inwardly, the retracting lever is drawn down out of engagement with the clutch lug and the clutch is forced into engagement with the teeth of the driving pulley by the action of springs $p^8$ seated in the clutch member and abutting against a disk $p^9$, also keyed upon the counter-shaft, the actuation of the cam sleeve $o'$ by the ratchet $o^5$ being continued as long as pressure on the knee lever is maintained. As soon as pressure upon the knee lever is relieved, the tension spring $p^{10}$ (Fig. 13) draws it back into its normal position and throws the clutch retractor upwardly into contact with the periphery of the clutch which is wedged or forced out of engagement with the pulley as soon as the two cam surfaces meet, this, however, not occuring until the countershaft has made at least one complete turn and the ratchet wheel moved through one tooth. The cam sleeve and its actuating parts are caused to stop positively, and without overthrow due to momentum, by means of a stop $p^{11}$ (Figs. 13, 15 and 16) formed also on the periphery of the clutch to engage with the end of the retractor and thereby bring the countershaft $p$ positively to rest, leaving the cam rolls always in the desired position.

To prevent the momentum of the cam sleeve with its attached members from carrying it beyond the position to which it is moved by each reciprocation of the pawl, the cam sleeve is also provided with a brake wheel $p^{12}$ (Figs. 2 and 13), with the periphery of which there is frictionally engaged (Fig. 13) a plunger $p^{13}$, of rawhide or any other suitable material, pressed against its wheel by a spring $p^{14}$, the latter adjustably seated in the rear of the frame.

The release of the heel carriage and its return to the position shown in Fig. 1, with the simultaneous unjacking of the shoe, is permitted directly and independently from the action of the cam sleeve by means of a separate knee lever $r$ (Figs. 1 and 17), which is linked by the connection $r'$ to the releasing lever $r^2$, the latter being pivoted to the frame and carrying at its upper end the horizontal transverse bearing roll $r^3$, which, on depression of the knee lever, is caused to swing downwardly and over the projecting ear $l^5$ of the carriage latch, causing the swinging latch member to be withdrawn from the stationary catches $l$ for the release of the carriage as described. This release of the carriage may be thus, and ordinarily will be, directly effected by the knee movement of the operator, but the knee lever $r$ is caused to overlie (Fig. 1) one end of the knee lever $p^7$, so that when the former is pressed to release the carriage, the knee lever $p^7$ may be, by the same knee movement, simultaneously swung to effect the turning of the cam sleeve for the unclamping of the heel band and the dropping of the toe post.

Any suitable means may be employed for returning the carriage to its outward position after release, but in the illustrated machine this is automatically effected immediately upon release by the then tensioned heel clamping spring $n^6$. After the carriage is rolled forward to the position in Fig. 2 and the cam sleeve turned to raise the toe post and tighten the heel band, the spring $n^6$ is tensioned by the pressure of the cam-actuated lever $n^9$ against the abutting heel clamping rod $n^7$, this acting to seat the carriage with the latches $l'$ against the catches $l$. As soon as the latches are lifted by movement of the knee lever $r$, the tensioned spring kicks the carriage back and away from the cam-operated lever $n^9$ to the outward position shown in Fig. 1.

During the lasting of the shoe it is sometimes desirable to provide additional hold-down means and I have therefore shown (Figs. 1 and 17) the swinging hold-down arm $s$, secured to the turning and sliding plunger-rod $s'$ adapted for vertical movement in suitably formed bearings in the frame, the lower end of the rod being attached to a tension rod $s^2$, secured to the foot treadle $s^3$, by which the operator may draw the plunger-rod down against the compression of an encircling spring $s^4$. The outer end of the rod may have any suitable means, detachable or otherwise, for engaging with the insole of the lasted shoe and for holding the latter firmly in position against the action of the wiper plates. The foot treadle (Fig. 1) near its end is provided with the catch $s^5$, which, when the lever is depressed, may engage with the teeth of the ratchet piece $s^6$, whereby the hold-down may be secured firmly in its holding position without further attention on the part of the operator.

The ratchet is swingingly mounted upon a pivot pin $s^x$ and normally drawn into engagement with the catch by the spring $s^7$, there being provided, however, the forwardly projecting foot-piece $s^8$, which when tapped or struck by the foot of the operator will act quickly to release the foot lever and to permit the spring of the hold-down to elevate the latter.

In order that the release of the hold-down may be accomplished at the appropriate time without conscious effort on the part of the operator, the hold-down ratchet is connected to the carriage releasing mechanism, so that the release of the carriage also effects a release of the hold-down. For this purpose there is connected to the carriage releasing lever $r^2$ the depending rod $t$, which, on releasing movement of the releasing lever, is caused both to move upwardly and swing slightly to one side. The lower end of the rod $t$ (Figs. 1, 14 and 17) is pivoted and guided by the ratchet pivot pin $s^x$ and has at its bottom the inclined side contacting with a pin $t'$, which is secured to the lower end of the ratchet. When the carriage releasing lever is raised for the release of the carriage, the depending rod $t$ is both raised and swung to one side about the ratchet pivot pin and acting against the pin $t'$ swings the ratchet away from the catch to cause release of the latter.

The general operation of the machine will be clear from the foregoing description of its mechanisms. The operator having placed the shoe to be lasted upon the heel post, as indicated in Fig. 1, by turning the hand wheel $k^{18}$ the heel of the shoe is retracted into the heel clamp and elevated against the overlapping edge of the wipers. By the same movement the operator draws the carriage into the position shown in Fig. 2, where it is automatically locked in position during the lasting operation by the swinging latch $l'$. In this position the inverted toe of the shoe is directly over the toe rest and the toe is in close proximity to the toe wiping plates. The operator then for an instant presses the knee lever $p^7$ throwing in the clutch to cause a single turn of the counter-sleeve and a partial rotation of the cam shaft, which results in the elevation of the toe post and the tightening of the heel band. The hold-down is then swung into position over the shoe and forced down by the foot lever, where it is held by the ratchet. The shoe being then firmly jacked and securely held in position the operator pressing upon the foot lever $j^9$ elevates the toe wiper plates and by manipulating them through the hand lever $d^9$ causes them to wipe the leather up and in against the toe and finally over the same in the usual manner. The heel wiping is performed also in the usual manner, the adjustments of the wiper plates to different inclinations transversely or lengthwise the carriage and the fore and aft adjustment of the toe carriage being effected as may be required to perform the operation. The lasting of the shoe having been completed and the lasted upper having been fastened by wiring or tacking, the entire mechanism is restored to its normal position shown in Fig. 1 by a single pressure upon the knee lever $r$, this acting simultaneously, as described, to drop the toe post, release and return the carriage, unclamp the heel band, drop and throw forward the heel post and release the hold-down.

While I have shown and described one practical embodiment of my invention in the foregoing specification for the purposes of illustrating the same, it is to be understood that the invention is not limited to the precise construction or to the details or form or arrangement of parts herein disclosed, but that extensive deviations therefrom may be made without departing from the spirit of this invention.

What I claim is:

1. A lasting machine having a tipping wiper carrier, a relatively stationary support, a segmental gear upon said carrier, means meshing with said gear for moving the same, and a linked connection between said gear and said stationary support.

2. A lasting machine having a vertically movable toe head, and separate rack and pinion devices for raising and for lowering said toe head.

3. A lasting machine having a vertically movable toe head, a foot treadle for lowering said toe head, and yieldable means tending to raise the same.

4. A lasting machine having a carriage carrying toe lasting devices, supporting means therefor vertically movable in suitable bearings in the frame, a cross-head below said frame bearings, and bracing means connecting said cross-head to the overhanging end of said supporting means.

5. In a lasting machine, the combination with a heel band, of a jack post, and means for simultaneously retracting said post bodily and raising the same bodily relatively to the heel band.

6. In a lasting machine, the combination with a heel lasting carriage carrying heel lasting devices, of a jack post, means for retracting said jack post relatively to the carriage, and means upon said carriage for raising the jack post on the retraction thereof.

7. In a lasting machine, the combination with a heel lasting carriage carrying lasting devices, of a jack post, means for retracting said post relatively to the lasting devices, and an inclined cam upon said carriage adapted to be engaged by the post on its retraction to elevate the same.

8. In a lasting machine, the combination with a heel lasting carriage, a jack post adapted to be simultaneously retracted and elevated with reference to the lasting devices carried thereby, and sliding adjusting means for varying the limits to which said post is elevated on retraction.

9. In a lasting machine, the combination with a heel lasting carriage, of a retractable jack post slide for said carriage, and a jack post rigidly guided for vertical movement in said slide on the retraction thereof.

10. In a lasting machine, the combination with a heel lasting carriage, of a retractable jack post upon said carriage and unyielding guiding means upon said carriage for causing the elevation of said post on the retraction thereof.

11. In a lasting machine, the combination with a movable heel lasting carriage, of a jack post, means for retracting said jack post relatively to the carriage, and means dependent upon the position of the carriage for locking said jack post in its retracted position.

12. In a lasting machine, the combination with a movable heel lasting carriage, of a jack post, means for retracting said jack post relatively to said heel lasting carriage, means for holding said jack post in its retracted position, and means dependent upon the position of the carriage for releasing the same.

13. In a lasting machine, the combination with a heel lasting carriage adapted to move to and from a lasting position, of a jack post, means for retracting said jack post relatively to the carriage and for holding the same in its retracted position, and means automatically to release said jack post on the return of said carriage from its lasting position.

14. In a lasting machine, the combination with heel lasting mechanism, of a suitable support therefor movable to and from a lasting position, a jack post adapted to be raised relatively to the lasting mechanism, means for retaining said post in its raised position, and means automatically to lower said post on the return of said carriage from its lasting position.

15. In a lasting machine, the combination with heel lasting mechanism, of a suitable support therefor movable to and from a lasting position, a jack post, operating means connected to retract said jack post relatively to said lasting mechanism, and sliding retaining means adapted to engage said operating means to maintain said jack post in its retracted position.

16. In a lasting machine, the combination with heel lasting mechanism, of a movable support therefor, a jack post, means for retracting said jack post relatively to said support, and retaining means for retaining said post in its retracted position, and means stationary relatively to said carriage for withdrawing said retaining devices from engagement with said retracting means.

17. In a lasting machine, the combination with a heel lasting carriage movable to and from a lasting position, of means for sliding said lasting carriage to and from lasting position, means for retaining said carriage in the lasting position, knee releasing means for said carriage and a knee-operated lever directly connected to said releasing means to cause release of said carriage.

18. In a lasting machine, the combination with a movable heel lasting carriage, means for locking said carriage in its lasting position, heel clamping mechanism upon said carriage, power-actuated means for operating said heel clamping mechanism, controlling means for controlling said power-actuated means, and separate controlling means for releasing said carriage.

19. In a lasting machine, the combination with a movable heel lasting carriage, a cam shaft, a cam shaft controlling lever, and a carriage releasing lever adjacent thereto.

20. In a lasting machine, the combination with a heel carriage releasing lever, and a cam shaft controlling lever, the latter adapted for separate actuating movement or for movement with and by the carriage releasing lever.

21. In a lasting machine, the combination with a knee-operated cam controlling lever and a separate knee-operated heel carriage releasing lever.

22. A lasting machine having a movable heel carriage adapted to be fixed in lasting position, a shoe hold-down and means for simultaneously releasing said carriage and said hold-down.

23. A lasting machine having a lasting mechanism, a movable support therefor, adapted to be fixed in lasting position, heel clamping mechanism upon said support, a shoe hold-down, a vertically movable toe post, and means simultaneously to release said carriage, hold-down and heel clamping mechanism and lower said toe post.

24. In a lasting machine, the combination with a heel lasting mechanism, of a movable support therefor, means for holding said support in lasting position, a shoe hold-down, and a single controlling means for releasing said support and said hold-down.

25. In a lasting machine, the combination of shoe supporting means, a carriage provided with lasting devices, a carriage base, said carriage and carriage base having arc-shaped rib and groove bearing connections curved on the arc of a circle the axis of which is in the plane of the bottom of the shoe and extending in a direction lengthwise of the shoe, and means for locking the carriage in adjusted position in said arc.

26. In a lasting machine, the combination of shoe supporting means, a carriage provided with wiper plates adapted to move over the bottom of the shoe to be lasted, a base for the carriage, an arc-shaped rib and groove bearing connection located between the wiper plates and base to permit lateral rocking movement of the wiper plates and direct that movement about an axis extending lengthwise of the shoe and located substantially in the plane of the bottom face of the shoe, and means for effecting and maintaining the said lateral adjustment of the wiper plates.

27. In a lasting machine, the combination of a lasting head, wiper plates adapted to lay the upper over the bottom of the shoe to be lasted, means for raising and lowering said head, arc-shaped rib and groove bearing connections between the lasting head and wiper plates curved about a center extending lengthwise through the bottom of the shoe to be lasted and disposed with relation to the wiper plates to furnish an unyielding support for said plates when pressed upon the bottom of the shoe.

28. In a lasting machine, the combination of shoe supporting means, a carriage provided with lasting means, a carriage base, said carriage and carriage base having laterally extending arc-shaped rib and groove bearing connections curved on the arcs of a circle, the center of which is in the plane of the bottom of the shoe to be lasted, and gear and segment connections for tilting the carriage laterally in said arc.

29. In a lasting machine, the combination with a heel lasting carriage movable to and from lasting position, of a jack post, means for retracting the jack post relative to the carriage, means for holding the jack post in its retracted position, and means for automatically releasing the jack post during the first part of the carriage movement away from lasting position.

30. In a lasting machine, the combination with a heel lasting carriage movable to and from lasting position, of a jack post, means for retracting the jack post relative to the carriage, means for holding the jack post in its retracted position and means for automatically tipping said holding means to release the jack post during the first part of the carriage movement away from lasting position and for maintaining said holding means in inoperative position during the further movement of the carriage from lasting position.

31. In a lasting machine, the combination with a heel lasting carriage movable to and from lasting position, of a jack post, movable with the carriage, a toe support, means for moving the toe support to sustain and release the toe of the shoe, means for retracting the jack post relative to the carriage, means for holding the jack post in retracted position, and means for releasing the jack post and toe support during the first part of the return movement of the carriage.

In testimony whereof, I have signed my name to this specification, in the presence of two subscribing witnesses.

PERLEY R. GLASS.

Witnesses:
WILLIAM R. CAMERON,
BEATRICE I. SMITH.

Copies of this patent may be obtained for five cents each, by addressing the "Commissioner of Patents, Washington, D. C."